C. J. PILLIOD.
THROTTLE VALVE.
APPLICATION FILED APR. 12, 1920.
1,384,567.
Patented July 12, 1921.
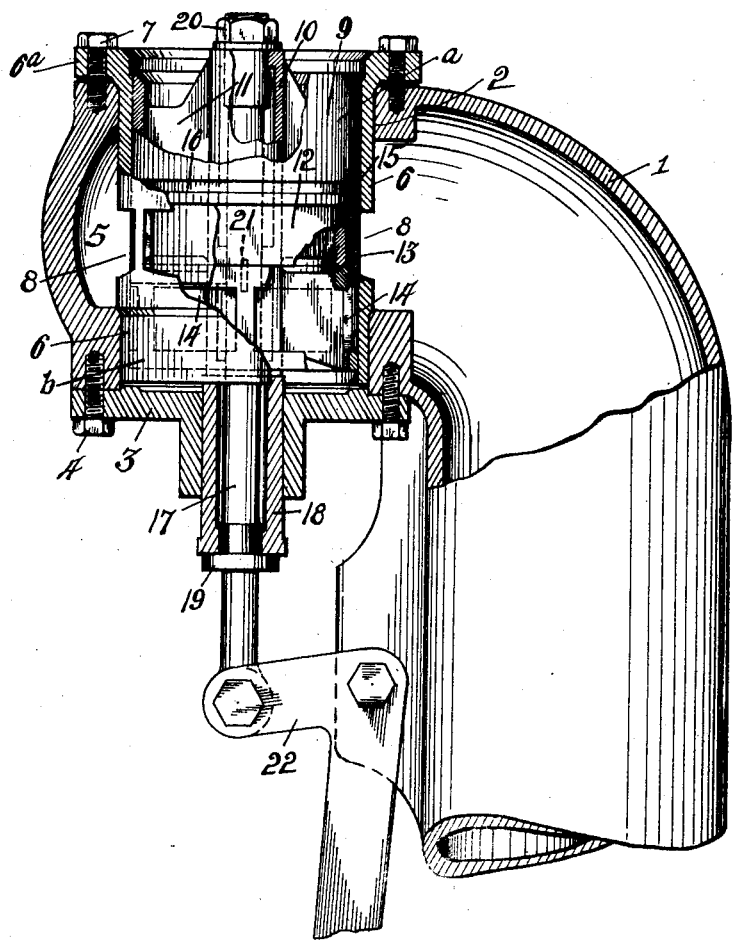
INVENTOR.
Charles J. Pilliod,
By Owen, Owen & Crampton,
His attys.

UNITED STATES PATENT OFFICE.

CHARLES J. PILLIOD, OF TOLEDO, OHIO, ASSIGNOR TO DANIEL SEARLES, TRUSTEE, OF TOLEDO, OHIO.

THROTTLE-VALVE.

1,384,567. Specification of Letters Patent. Patented July 12, 1921.

Application filed April 12, 1920. Serial No. 373,298.

*To all whom it may concern:*

Be it known that I, CHARLES J. PILLIOD, a citizen of the United States, and a resident of Toledo, county of Lucas, and State of Ohio, have made an Invention Appertaining to Throttle-Valves; and I do hereby declare the following to be a full, clear, and exact description of the invention, such as will enable others skilled in the art to which it appertains to make and use the same, reference being had to the accompanying drawing and the characters of reference marked thereon, which form a part of this specification.

This invention relates to throttle valves of the type used particularly on locomotives, and has for its object the provision of an improved valve of this character, of simple and inexpensive construction and capable of easy and quick substitution for the working parts of throttle valves of similar character now in use.

The invention is fully described in the following specification, and while, in its broader aspect, it is capable of embodiment in numerous forms, a preferred embodiment thereof is illustrated in the accompanying drawing, which is a central longitudinal section of a valve embodying the invention with parts in full and with the valve in closed position.

Referring to the drawing, 1 designates a pipe adapted to have communication with a source of fluid pressure supply and closed at one end except for a cylindrical opening 2 transversely therethrough, the bottom of which, in the present instance, is closed by a plate 3 secured to the pipe by screws 4, or in any other suitable manner. The walls of the opening 2 extend from each end thereof a distance into the pipe and coöperate with the pipe wall to form an annular space 5 surrounding the opening and in communication with the pipe passage.

A cylindrical valve cage 6 is inserted into the opening 2 from its open end, having a close fit or bearing at each end in the respective end wall of the opening and having its outer end provided with an external annular flange 6ª for overlapping the opening wall at its open end and secured thereto by screws 7, or in any other suitable manner. The upper flanged end of the cage 6 is open, while the lower end thereof, when disposed in the pipe opening, is closed by the plate 3. The cage is provided with an annular series of ports 8 opening communication between its interior and the surrounding space 5 of the pipe.

A trunk-valve 9 of cylindrical form has a sliding fit in the cage 6 for movements axially thereof, and has a hollow hub portion 10 connected to the rim portion thereof by a plurality of circumferentially spaced longitudinally extending radial webs 11. The valve is provided with a circumferential recess 12 receiving a junk-ring 13, which, when the valve is in closed position, spans the cage ports 8 and closes the same, due to the close or ground fit of the ring in the cage. An annular series of openings 14 are provided in the cylindrical wall or rim portion of the valve, immediately below the junk-ring 13, to register with the cage ports 8 and open communication between the space 5 and the upper open end of the valve through the interior thereof when the valve is raised from its closed position. A split gasket or packing-ring 15 is mounted in a circumferential groove 16 in the valve above the junk-ring 13 for engagement with the cage wall. For convenience in mounting the junk-ring on the valve and retaining it in position thereon, the valve is made of upper and lower sections *a* and *b*, respectively, which shoulder against longitudinally spaced portions of the ring, as shown. The openings 14 are in the lower section.

A rod or stem 17 extends axially through the hub portions of the two valve sections and through a bushing member 18 at the lower end of the valve, and these parts are drawn firmly together by a shoulder 19 on the rod engaging the outer end of the bushing and by a nut 20 on the upper end of the rod engaging the upper hub end of the valve. A key 21 extends through the valve rod in engagement with the adjacent hub ends of the valve sections to prevent a relative turning of the sections. The bushing 18 has a close sliding fit in a bearing opening in the plate 3 through which it projects.

The movements of the valve are controlled by a lever 22 attached to the lower end of the stem 17, or may be effected in any other suitable manner.

It is evident in the use of my improved valve that when the valve member 9 is in its lowered position within the cage 6, the cage ports 8 are closed by the junk-ring 13, thereby closing communication between the interior of the pipe 1 and the open end of the valve. Upon a raising of the valve 9 from its closed position the cage ports 8 will be gradually uncovered, the extent of opening of such ports depending on the extent of movement of the valve. This type of valve is adapted to be inserted into or removed bodily, together with its cage 6, from the pipe opening 2, and may be used in lieu of the locomotive valves commonly employed in the pipe openings.

I wish it understood that my invention is not limited to any specific construction, arrangement or form of the parts, as it is capable of numerous modifications and changes without departing from the spirit of the claim.

Having thus described my invention, what I claim as new, and desire to secure by Letters Patent, is,—

In combination, a fluid pressure line, a cylindrical valve cage removably set into the line and having a set of ports arranged therearound in communication with the interior of the line, a hollow trunk-valve fitted in the cage for axial movements therein, said valve having a hollow hub portion with circumferentially spaced webs radiating therefrom to the rim portion of the valve, a junk-ring carried circumferentially by the valve in position to close the cage ports when the valve is in one position, the valve compressing longitudinally separable sections shouldering against the junk-ring to retain it in position thereon, and with one section provided with ports adapted to uncover the cage ports to the interior of the valve when the valve is moved from closed position, and a valve stem projecting through the valve and from one end thereof without the line and serving to retain the parts of the valve in assembled relation.

In testimony whereof I have hereunto signed my name to this specification.

CHARLES J. PILLIOD.